United States Patent [19]
Niiyama

[11] Patent Number: 5,665,022
[45] Date of Patent: Sep. 9, 1997

[54] CONTROL SYSTEM FOR BELT-TYPE CONTINUOUSLY VARIABLE TRANSMISSION

[75] Inventor: Tsunefumi Niiyama, Wako, Japan

[73] Assignee: Honda Giken Kogyo Kabushiki Kaisha, Tokyo, Japan

[21] Appl. No.: 610,707

[22] Filed: Mar. 4, 1996

[30] Foreign Application Priority Data

Mar. 2, 1995 [JP] Japan ................. 7-043299

[51] Int. Cl.⁶ .................................. B60K 41/12
[52] U.S. Cl. .................. 477/46; 477/48; 474/18
[58] Field of Search ................ 477/45, 46, 48, 477/49; 474/18, 28

[56] References Cited

U.S. PATENT DOCUMENTS

| | | | |
|---|---|---|---|
| 4,387,608 | 6/1983 | Mohl et al. | 477/49 |
| 4,663,991 | 5/1987 | Nakamura et al. | 477/49 |
| 4,752,277 | 6/1988 | Morimoto | 474/18 |
| 4,781,655 | 11/1988 | Tezuka | 474/28 |
| 4,995,283 | 2/1991 | Sawasaki et al. | 477/48 |
| 5,020,392 | 6/1991 | Morimoto | 477/49 |
| 5,083,982 | 1/1992 | Sato | 477/49 X |
| 5,112,280 | 5/1992 | Sato | 474/18 |
| 5,169,366 | 12/1992 | Reniers | 477/45 X |
| 5,232,406 | 8/1993 | Sato | 474/28 |
| 5,319,999 | 6/1994 | Morishige et al. | 477/46 |
| 5,431,602 | 7/1995 | Hendriks et al. | 477/48 X |

FOREIGN PATENT DOCUMENTS

| | | |
|---|---|---|
| 304085 | of 1989 | European Pat. Off. |
| 313287 | of 1989 | European Pat. Off. |
| 498210 | of 1992 | European Pat. Off. |
| 2133095 | of 1984 | United Kingdom |

OTHER PUBLICATIONS

Search Report.
English language Abstract of JP 62028561.
English language Abstract of JP 58094664.

*Primary Examiner*—Charles A. Marmor
*Assistant Examiner*—Peter T. Kwon
*Attorney, Agent, or Firm*—Lyon & Lyon LLP

[57] ABSTRACT

The gear ratio of a belt-type continuously variable transmission is changed by increasing or decreasing the hydraulic pressure applied to an oil chamber for a drive pulley by a ratio control valve. A spool of the ratio control valve is driven by a normally opened solenoid valve and a normally closed solenoid valve. In a lower gear ratio range, the gear ratio is controlled by controlling the duty rate of the normally opened solenoid valve, and in a higher gear ratio range, the gear ratio is controlled by controlling the duty rate of the normally closed solenoid valve. When any trouble is generated, the gear ratio is held at an intermediate value by bringing both the duty rates of the normally opened solenoid valve and the normally closed solenoid valve into 0% or 100%. Thus, it is possible to finely control the gear ratio of the belt-type continuously variable transmission and, when any trouble is generated, the gear ratio can be held at the value intermediate between a LOW value and an OD value.

6 Claims, 8 Drawing Sheets

Intermediate

OD

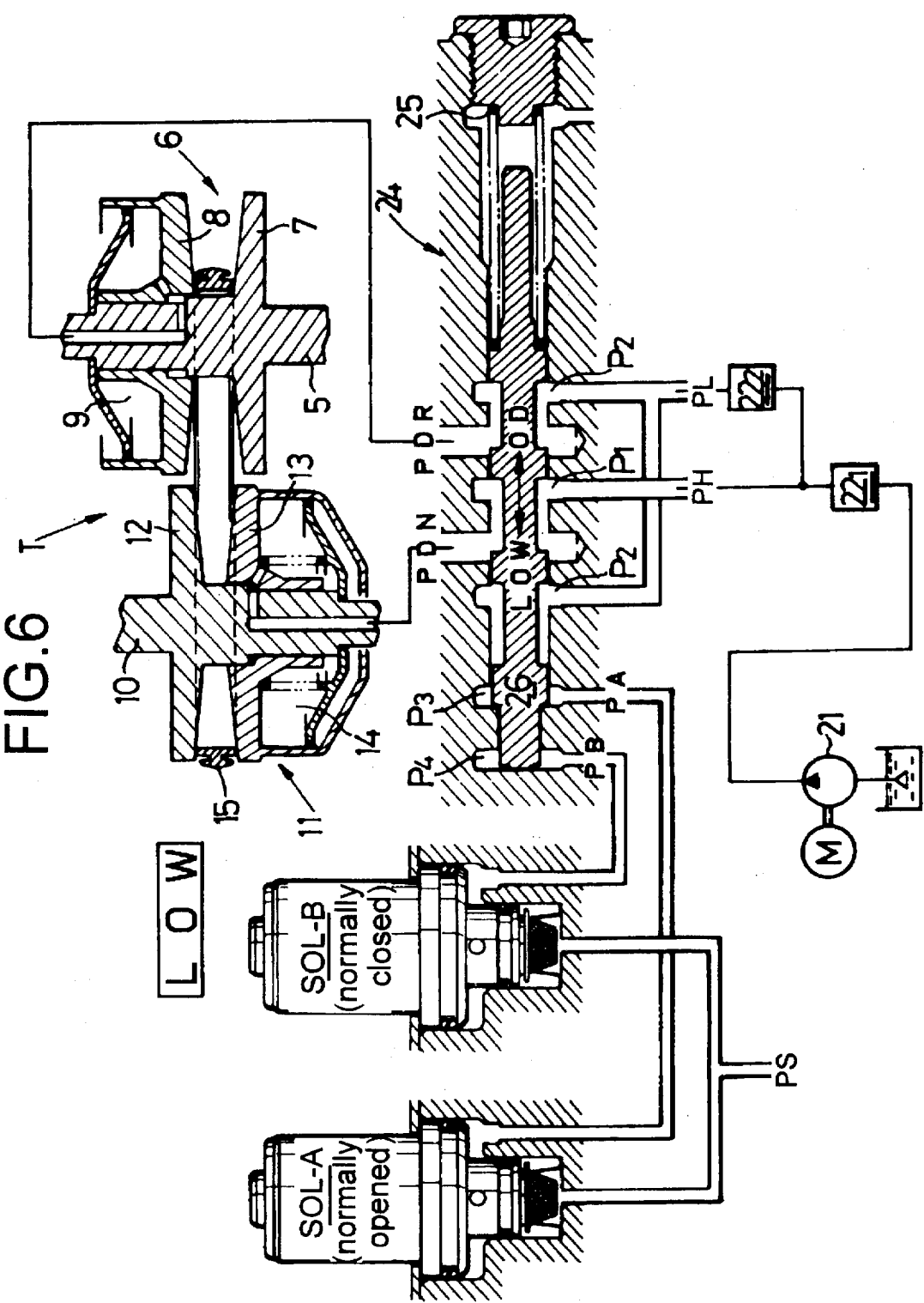

CONTROL SYSTEM FOR BELT-TYPE CONTINUOUSLY VARIABLE TRANSMISSION

BACKGROUND OF THE INVENTION

1. Field of the Invention

The present invention relates to a control system for a belt-type continuously variable transmission of the type that includes a drive pulley which is variable in groove width; a driven pulley which is variable in groove width; an endless belt wound around both of the pulleys; a ratio control valve for controlling a gear ratio by increasing or decreasing a hydraulic pressure supplied to at least one of oil chambers for the pulleys; and a solenoid valve means which is controlled to supply a control hydraulic pressure to the ratio control valve.

2. Description of Related Art

In a known control system for a belt-type continuously variable transmission, the ratio control valve is controlled between a LOW position and an OD position by a single solenoid capable of being duty-controlled, thereby increasing or decreasing the hydraulic pressure supplied to at least one of the oil chambers of the drive pulley and the driven pulley to change the gear ratio.

Such known control system for the belt-type continuously variable transmission suffers not only from a problem that it is difficult to effect a fine precise control, because the gear ratio is controlled from the LOW value to the OD value by the single solenoid valve, but also is accompanied by the following disadvantage: when the solenoid valve fails or has an ON trouble or an OFF trouble, the gear ratio is held at the LOW or OD value and, as a result, it is difficult to start the vehicle, or an over-revolution of the engine is generated.

SUMMARY OF THE INVENTION

Accordingly, it is an object of the present invention to provide a control system for belt-type continuously variable transmission, wherein it is possible to effect a fine precise control, and when the solenoid valve itself experiences any trouble, or when the control system experiences any trouble, the gear ratio can be held at an intermediate value.

To achieve the above object, according to a first aspect and feature of the present invention, there is provided a control system for a belt-type continuously variable transmission, comprising: a drive pulley which is variable in groove width; a driven pulley which is variable in groove width; an endless belt wound around both of the pulleys; a ratio control valve for controlling a gear ratio by increasing or decreasing a hydraulic pressure supplied to at least one of oil chambers for the pulleys for varying the widths of the pulleys; and a solenoid valve means which is controlled to supply a control hydraulic pressure to the ratio control valve, wherein the solenoid valve means comprises a first solenoid valve and a second solenoid valve, and in a lower gear ratio range, one of the solenoid valves is controlled, and the other solenoid valve is fixed at a predetermined control quantity, while in a higher gear ratio range, the other solenoid valve is controlled, and the one solenoid valve is fixed at the predetermined control quantity.

With the first feature of the present invention, when the solenoid valve means is controlled to supply the control hydraulic pressure to the ratio control valve, the hydraulic pressure supplied from the ratio control valve to the oil chamber for at least one of the drive pulley and the driven pulley is increased or decreased, causing the gear ratio to be changed. At that time, in the lower gear ratio range, one of the first and second solenoid valves is controlled, and the other solenoid valve is fixed at the control quantity of 0 (zero), and in the higher gear ratio range, the other solenoid valves is controlled, and the one solenoid valve is fixed at the control quantity of 0 (zero). Therefore, it is possible to effect a fine precise control, as compared with the case where the single solenoid valve is used, and moreover, the burden of the control system can be alleviated.

According to a second aspect and feature of the present invention, in addition to the first feature, one of the first and second solenoid valves is of a normally opened type which is brought into an opened state with the control quantity of 0 (zero), and the other solenoid valve is of a normally closed type which is brought into a closed state with the control quantity of 0 (zero), and in an intermediate gear ratio range, the control quantity of each of the solenoid valves is equal to 0 (zero).

According to a third aspect and feature of the present invention, in addition to the first feature, one of the first and second solenoid valves is of a normally opened type which is brought into an opened state with the control quantity of 0 (zero), and the other solenoid valve is of a normally closed type which is brought into a closed state with the control quantity of 0 (zero), and in an intermediate gear ratio range, the control quantity of both the solenoid valves is equal to a maximum value.

With the second or third features of the present invention, when any trouble is generated, the gear ratio is held at a value intermediate between the LOW and OD values by bringing the control quantity of both the solenoid valves into 0 or the maximum value.

According to a fourth aspect and feature of the present invention, in addition to the first feature, the predetermined control quantity is equal to 0 (zero).

With the fourth feature of the present invention, the control quantity of one of the solenoid valves is necessarily equal to 0 and therefore, the burden of the control system can be further alleviated, but also when a power source is lost due to any trouble or the like, the control quantity of both the solenoid valves are brought into 0 (zero), whereby the gear ratio can be held at a predetermined value.

The above and other objects, features and advantages of the invention will become apparent from the following detailed description of preferred embodiments taken in conjunction with the accompanying drawings.

BRIEF DESCRIPTION OF THE DRAWINGS

FIG. 6 is a view of a hydraulic control system for a belt-type continuously variable transmission according to a second embodiment of the present invention;

DETAILED DESCRIPTION OF THE PREFERRED EMBODIMENTS

The present invention will now be described by way of preferred embodiments with reference to the accompanying drawings.

Figure 1:
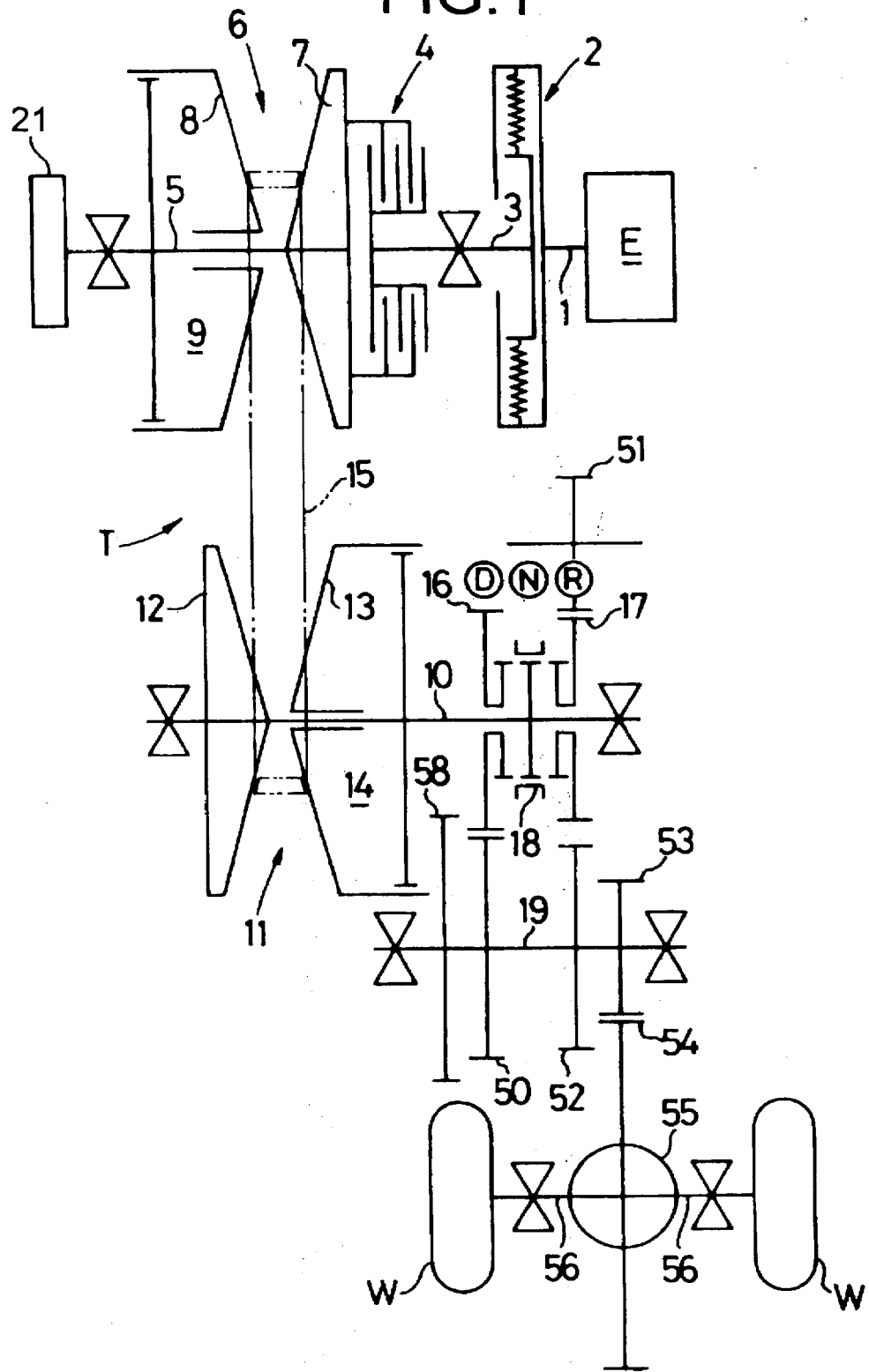
FIG. 1 is a skeleton illustration of a power transmitting system in a vehicle.

Referring to FIG. 1 illustrating a first embodiment of the present invention, an input shaft 3 is connected to a crankshaft 1 of an engine E through a damper 2 and also to a drive shaft 5 of a belt-type continuously variable transmission T through a starting clutch 4. A drive pulley 6 is mounted on the drive shaft 5 and includes a stationary pulley half 7 secured to the drive shaft 5, and a movable pulley half 8 capable of being moved toward and away from the stationary pulley half 7. The movable pulley half 8 is biased toward the stationary pulley half 7 by a hydraulic pressure applied to an oil chamber 9.

A driven pulley 11 is mounted on a driven shaft 10 disposed in parallel with the drive shaft 5 and includes a stationary pulley half 12 secured to the driven shaft 10, and a movable pulley half 13 capable of being moved toward and away from the stationary pulley half 12. The movable pulley half 13 is biased toward the stationary pulley half 12 by a hydraulic pressure applied to an oil chamber 14. An endless belt 15 is wound around the drive pulley 6 and the driven pulley 11 and has a large number of metal pieces connected thereto.

In the belt-type continuously variable transmission T in the first embodiment, the axially perpendicular sectional area of the oil chamber 9 for the drive pulley 6 is set at a value twice as large as that of the oil chamber 14 for the driven pulley 11 (Note that the chambers 9 and 14 are not illustrated to scale in FIG. 1).

A forward drive gear 16 and a reverse drive gear 17 are relatively rotatably carried on the driven shaft 10 and are capable of being selectively coupled to the driven shaft 10 by a selector 18. The following gears are secured to an output shaft 19 disposed in parallel to the driven shaft 10: a forward driven gear 50 meshed with the forward drive gear 16; and a reverse driven gear 52 meshed with the reverse drive gear 17 through a reverse idle gear 51.

The rotation of the output shaft 19 is inputted to a differential 55 through a final drive gear 53 and a final driven gear 54 and transmitted from the differential 55 through left and right axles 56, 56 to driven wheels W, W. In FIG. 1, reference character 21 is an oil pump, and reference character 58 is a parking gear.

A driving force from the engine E is transmitted through the crankshaft 1, the damper 2, the input shaft 3, the starting clutch 4, the drive shaft 5, the drive pulley 6, the endless belt 15 and the driven pulley 11 to the driven shaft 10. When a forward travel range is selected, the driving force from the driven shaft 10 is transmitted through the forward drive gear 16 and the forward driven gear 50 to the output shaft 19 to cause the forward traveling of a vehicle. When a reverse travel range is selected, the driving force from the driven shaft 10 is transmitted through the reverse drive gear 17, the reverse idle gear 51 and the reverse driven gear 52 to the output shaft 19 to cause the backward traveling of the vehicle.

At that time, the transmission gear ratio is regulated continuously by controlling the hydraulic pressure applied to the oil chamber 9 for the drive pulley 6 of the belt-type continuously variable transmission T. More specifically, if the effective radius of the drive pulley 6 is decreased by decreasing the hydraulic pressure applied to the oil chamber 9 for the drive pulley 6 to increase the groove width, the groove width of the driven pulley 11 is correspondingly decreased to increase the effective radius of the driven pulley 11 and hence, the gear ratio of the belt-type continuously variable transmission T is varied continuously toward a low value. On the other hand, if the effective radius of the drive pulley 6 is increased by increasing the hydraulic pressure applied to the oil chamber 9 for the drive pulley 6 to decrease the groove width, the groove width of the driven pulley 11 is increased to decrease the effective radius of the driven pulley 11 and hence, the gear ratio of the belt-type continuously variable transmission T is varied continuously toward an over drive value (OD value).

A hydraulic control circuit for the belt-type continuously variable transmission T will be described below with reference to FIG. 2.

A working oil discharged by the oil pump 21 is reduced to a pressure PH through a regulator valve 22. This pressure PH is further reduced to a pressure PM through a modulator valve 23. A ratio control valve 24 comprising a spool valve includes a spool 26 which is resiliently biased in a left direction by a valve spring 25. The pressure PH from the regulator valve 22 is transmitted to a port $P_1$ in the ratio control valve 24, and the pressure PM from the modulator valve 23 is transmitted as a pressure PA through a normally opened solenoid valve SOL-A to a port $P_2$ in the ratio control valve 24 and also transmitted as a pressure PB through a normally closed solenoid valve SOL-B to a port $P_3$ in the ratio control valve 24.

The pressure PA is applied to a stepped portion in the vicinity of a right end of the spool 26 to urge the spool 26 in a left direction, and the pressure PB is applied to the right end of the spool 26 to urge the spool 26 in the left direction.

The pressure PH from the regulator valve 22 is transmitted directly as a pressure PDN to the oil chamber 14 for the driven pulley 11. The pressure PH is regulated by the ratio control valve 24 and transmitted as a PDR pressure through a port $P_4$ to the oil chamber 9 for the drive pulley 6. A hydraulic pressure is generated in the oil chamber 9 for the drive pulley 6 by the opposing tension force of the endless belt 15 and that hydraulic pressure also is applied through a port $P_5$ to a left end face of the spool 26 to urge the spool 26 in a right direction.

Figure 3:
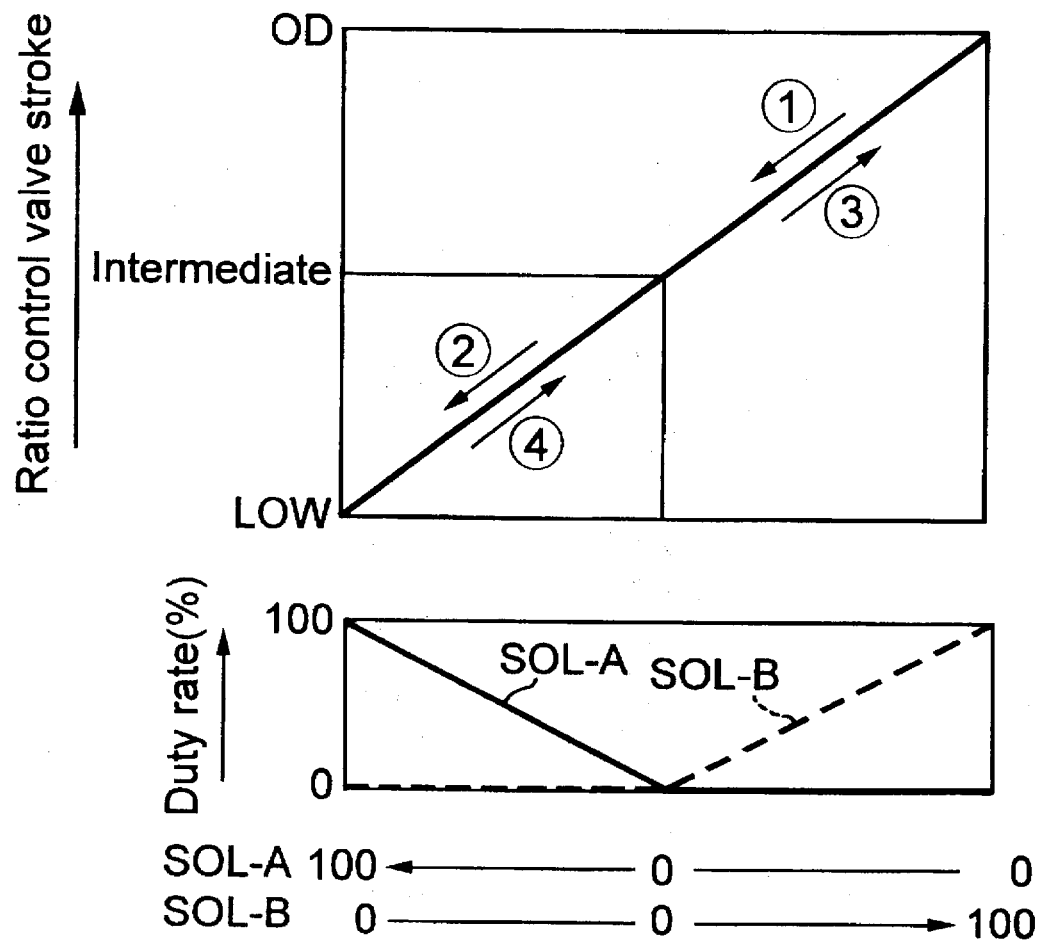
FIG. 3 is a graph illustrating the relationship between the duty rate of the solenoid valves and the operation of the ratio control valve.

As shown in FIG. 3, when the gear ratio of the belt-type continuously variable transmission T is equal to the LOW value, the duty rate (Duty A) of the normally-opened solenoid valve SOL-A is equal to 100% (which indicates the fully closed state of the normally-opened solenoid valve SOL-A). When the gear ratio is varied from the LOW value toward an intermediate value (a gear ratio of approximately 1), the duty rate Duty A is decreased linearly to 0% (which indicates a fully opened state of the normally-opened solenoid valve SOL-A). When the gear ratio is varied from the intermediate value to the OD value, the duty rate Duty A is maintained at 0%. On the other hand, when the gear ratio of the belt-type continuously variable transmission T is equal to the LOW value, the duty rate (Duty B) of the normally-closed solenoid valve SOL-B is equal to 0% (which indicates a fully closed state of the normally-closed solenoid valve SOL-B). When the gear ratio is varied from the LOW value to the intermediate value ($\approx 1$), the duty rate (Duty B) is maintained at 0%. When the gear ratio is varied from the intermediate value to the OD value, the duty rate Duty B is increased linearly toward 100% (which indicates a fully opened state of the normally-closed solenoid valve SOL-B).

A similar result can be achieved by having solenoid valve SOL-A of a normally closed type and solenoid valve SOL-B of a normally open type whereby when the duty rates Duty A and Duty B are both maximum (100%), the gear ratio is at the intermediate value.

Therefore, as shown in Table 1 below, at the gear ratio LOW, both of the solenoid valves SOL-A and SOL-B are closed and at the gear ratio OD, both of the solenoid valves SOL-A and SOL-B are opened. At the intermediate gear ratio, the solenoid valve SOL-A is opened, and the solenoid valve SOL-B is closed.

TABLE 1

| | Gear ratio | | | | |
|---|---|---|---|---|---|
| | LOW | Inter-mediate | OD | (Inter-mediate) | (Inter-mediate) |
| Trouble | | | | OFF trouble | ON trouble |
| SOL-A (normally opened) | 100% CLOSE | 0% OPEN | 0% OPEN | 0% OPEN | 100% CLOSE |
| SOL-B (normally closed) | 0% CLOSE | 0% CLOSE | 100% OPEN | 0% CLOSE | 100% OPEN |

Figure 2:
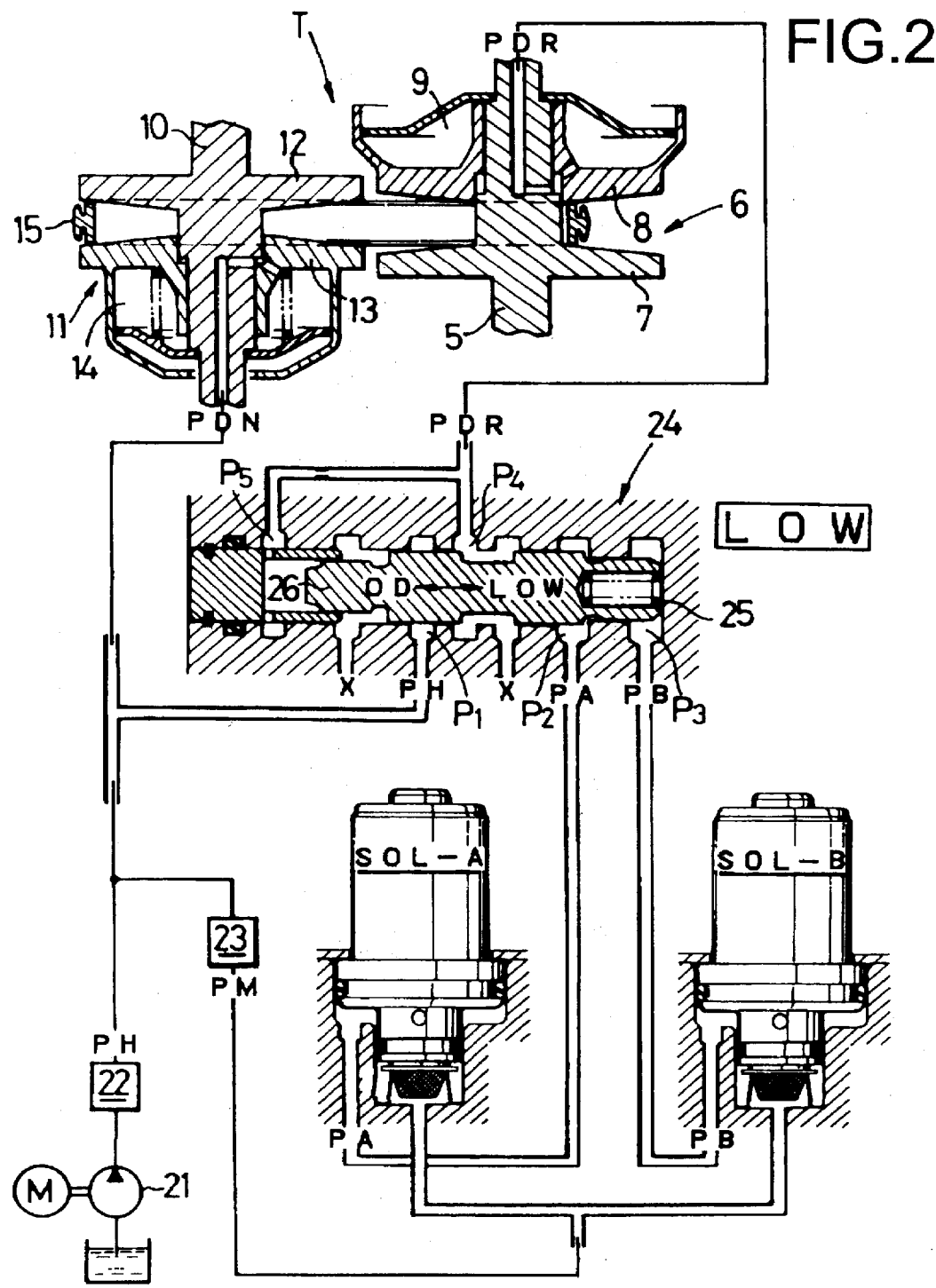
FIG. 2 is a view of a hydraulic control system for a belt-type continuously variable transmission according to a first embodiment of the present invention.

FIG. 2 shows a condition in which the gear ratio is equal to the LOW value. In this condition, the normally opened solenoid valve SOL-A is in the fully closed state with its duty rate Duty A equal to 100% and, and the normally closed solenoid valve SOL-B is in the fully closed state with its duty rate Duty B equal to 0% and. Therefore, the pressure PA and the pressure PB are not applied to the ports $P_2$ and $P_3$ in the ratio control valve 24, and the spool 26 is in the right end position shown in FIG. 2 under the action of the hydraulic pressure applied to the port $P_5$. Thus, the port $P_4$ connected to the oil chamber 9 for the drive pulley 6 is exposed to the atmosphere, and the pressure PH from the port $P_1$ is blocked. As a result, the gear ratio is maintained at the LOW value by pressure PDN (pressure PH) transmitted to the oil chamber 14 for the driven pulley 11.

Figure 4A:
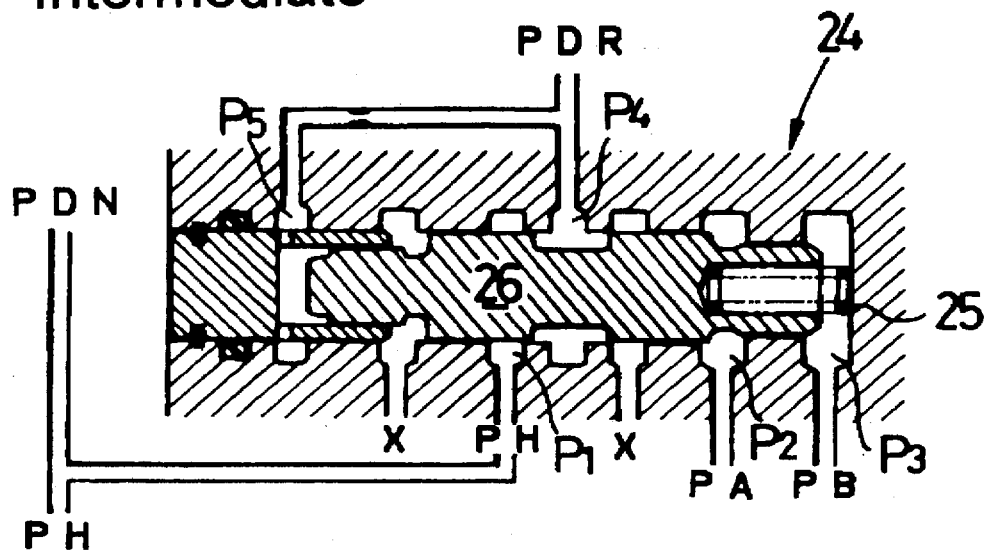
FIGS. 4A and 4B are views for explaining the operation of the ratio control valve.

When the duty rate Duty A of the solenoid valve SOL-A is decreased from 100% toward 0%, so that the opening degree of the solenoid valve SOL-A is gradually increased, the pressure PA applied to the port $P_2$ in the ratio control valve 24 is gradually increased, whereby the spool 26 is moved leftwardly, as shown in FIG. 4A. As a result, the port $P_1$ is gradually brought into communication with the port $P_4$, causing the pressure PH to be applied as the pressure PDR to the oil chamber 9 for the drive pulley 6. Thus, the gear ratio is changed from the LOW value toward the intermediate value.

Figure 4B:
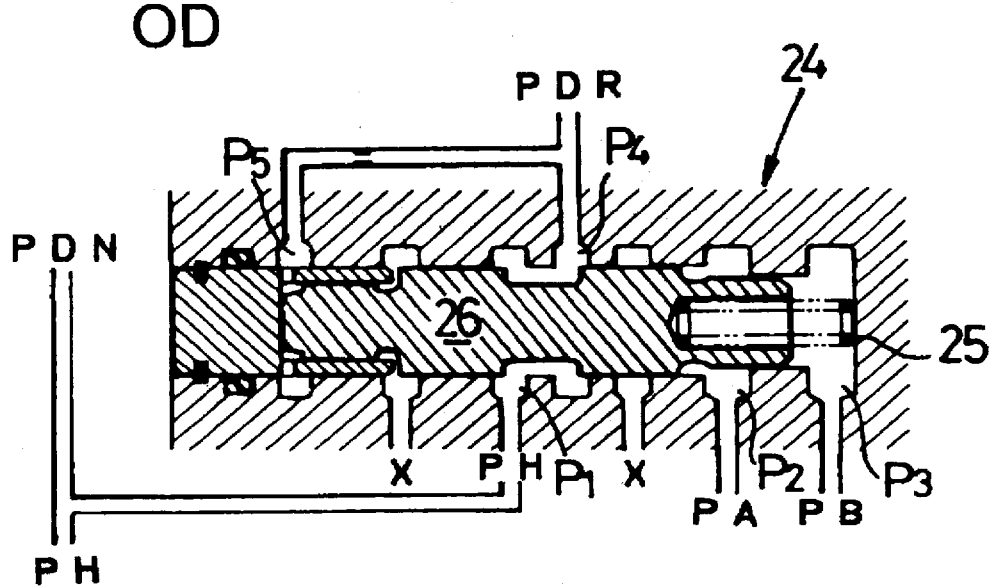

Further, when the duty rate Duty B of the solenoid valve SOL-B is increased from 0% toward 100%, so that the opening degree of the solenoid valve SOL-A is gradually increased, the pressure PB applied to the port $P_3$ in the ratio control valve 24 is gradually increased, whereby the spool 26 is moved to the left end position, as shown in FIG. 4B. As a result, the port P1 is brought into complete communication with the port P4, causing the full pressure PH to be applied in an intact manner as the PDR pressure to the oil chamber 9 for the drive pulley 6. Thus, the gear ratio is changed from the intermediate value to the OD value by a difference in the sectional area between the oil chambers 9 and 14 for the drive pulley 6 and the driven pulley 11.

The above-described operation will be further described with reference to a flow chart in FIG. 5.

First, in a range (1) in FIG. 3 in which the gear ratio is decreased from the OD value to the intermediate value by a downshifting, the solenoid valve SOL-A is in its OFF state, and the solenoid valve SOL-B is in its ON state (at steps S1, S2 and S3). At that time, the duty rate Duty B of the solenoid valve SOL-B in the ON state is gradually decreased from 100% toward 0% (at step S4). If the duty rate Duty B of the solenoid valve SOL-B in the ON state reaches a negative value below 0%, whereby the gear ratio is decreased to the intermediate value (at step S5), the solenoid valve SOL-B is turned OFF (at step S6), and the absolute value of the duty rate Duty B of the solenoid valve SOL-B is brought into a value equal to the duty rate Duty A of the solenoid valve SOL-A (at step S7).

In a range (2) in FIG. 3 in which the gear ratio is decreased from the intermediate value toward the LOW value by an downshifting, the solenoid valve SOL-A is in its ON state, and the solenoid valve SOL-B is in its OFF state (at steps S1, S2 and S3). At that time, the duty rate Duty A of the solenoid valve SOL-A in the ON state is gradually increased from 0% toward 100% (at step S8), the gear ratio becomes the LOW value.

On the other hand, in a range (4) in FIG. 3 in which the gear ratio is increased from the LOW value to the intermediate value by an upshifting, the solenoid valve SOL-A is in its ON state, and the solenoid valve SOL-B is in its OFF state (steps S9, S10 and S11). At that time, the duty rate Duty A of the solenoid valve SOL-A in the ON state is gradually decreased from 100% toward 0% (at step S12). If the duty rate Duty A of the solenoid valve SOL-A reaches a negative value below 0%, whereby the gear ratio is increased to the intermediate value (at step S13), the solenoid valve SOL-A is turned OFF (at step S14), and the absolute value of the duty rate Duty A of the solenoid valve SOL-A is brought into a value equal to the duty rate Duty B of the solenoid valve SOL-B.

In a range (3) in FIG. 3 in which the gear ratio is increased from the intermediate value toward the OD value, the solenoid valve SOL-A is in its OFF state, and the solenoid valve SOL-B is in its ON state (steps S9 and S10). At that time, if the duty rate Duty B of the solenoid valve SOL-B is gradually increased from 0% to 100% (at step S16), the gear ratio becomes the OD value.

When the spool 26 of the ratio control valve 24 is moved, as described above, the change of gear ratio between the LOW value and the intermediate value is conducted by controlling the duty rate of the solenoid valve SOL-A, and the change of gear ratio between the OD value and the intermediate value is conducted by controlling the duty rate of the solenoid valve SOL-B. Therefore, it is possible to effect a fine precise control, as compared with the case where a single solenoid valve is used, but also at least one of the duty rate Duty A of the solenoid valve SOL-A and the duty rate Duty B of the solenoid valve SOL-B is necessarily equal to 0%, which can contribute to an alleviation in the burden of the control system.

For example, if the supply of electric power to the solenoid valves SOL-A and SOL-B is cut off, causing both of the solenoid valves SOL-A and SOL-B to be fixed in their OFF states (see OFF trouble in Table 1), the solenoid valve SOL-A is opened with its duty rate Duty A brought into 0%, and the solenoid valve SOL-B is closed with its duty rate Duty B brought into 0%. Thus, the gear ratio of the belt-type continuously variable transmission T is held at the intermediate value.

If the gear ratio of the belt-type continuously variable transmission T is held at the OD value when a trouble is generated, the vehicle will be unable to start moving. If the gear ratio of the belt-type continuously variable transmission T is held at the LOW value, there is a possibility that an over-revolution of the engine E may be generated as the vehicle speed increases. However, if the gear ratio of the belt-type continuously variable transmission T is held at the intermediate value, as described above, the starting and traveling of the vehicle can be achieved, to be sure, without any hindrance. More specifically, if the load applied to the endless belt 15 of the belt-type continuously variable transmission T is increased at the start of movement of the vehicle, the internal hydraulic pressure in the oil chamber 9 for the drive pulley 6 is increased and applied to the port $P_5$ to urge the spool 26 rightwardly. This causes the gear ratio to be changed from the intermediate value to the LOW value to enable the starting movement of the vehicle. When the starting load on the vehicle is reduced as the speed increases, the gear ratio is changed toward the intermediate value by such self-shifting function to prevent the over-revolution of the engine E.

If only one of the solenoid valves SOL-A and SOL-B has an OFF trouble, i.e. that solenoid valve remains OFF with a 0% duty rate, the gear ratio of the belt-type continuously variable transmission T can be held at the intermediate value by controlling only the other of the solenoid valves SOL-A and SOL-B into its OFF state. If only one of the solenoid valves SOL-A and SOL-B has an ON trouble, i.e. that solenoid valve remains ON with a 100% duty rate, the other of the solenoid valve SOL-A and SOL-B is controlled into its ON state. As a result, the solenoid valve SOL-A is closed with its duty rate Duty A brought into 100%, and the solenoid valve SOL-B is opened with its duty rate Duty B brought into 100%, as shown by the ON trouble in Table 1. Thus, the pressure PA is not transmitted to the port $P_2$ in the ratio control valve 24, and the pressure PB is transmitted to the port $P_3$, whereby the gear ratio of the belt-type continuously variable transmission T can be likewise held at the intermediate value.

Figure 7A:
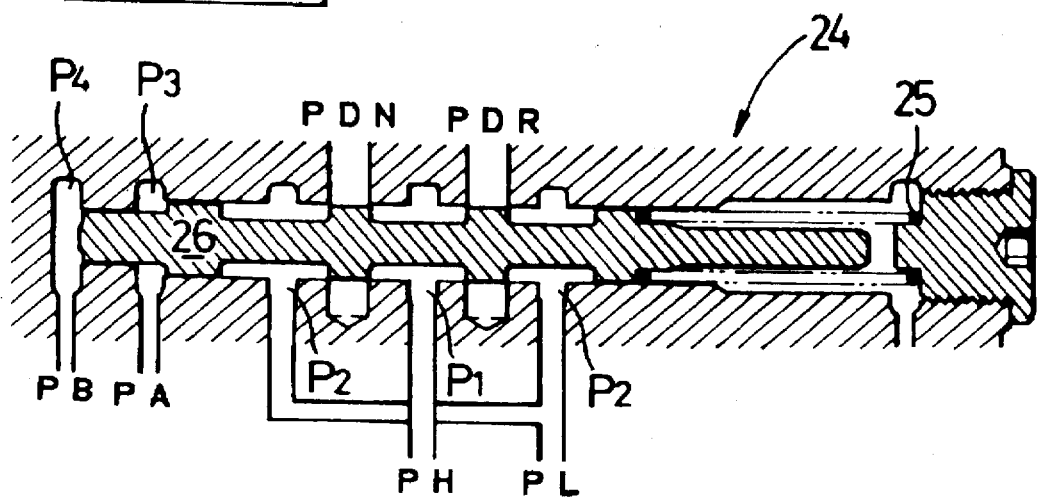
FIGS. 7A and 7B are views for explaining the operation of the ratio control valve.

A second embodiment of the present invention will now be described with reference to FIGS. 6 to 8.

As shown in FIG. 6, in a belt-type continuously variable transmission T according to the second embodiment, the axially perpendicular sectional area of an oil chamber 9 for a drive pulley 6 is set at a value equal to that of an oil chamber 14 for a driven pulley 11.

The pressure of a working oil discharged from then oil pump 21 is reduced to a pressure PH through a first regulator valve $22_1$. The pressure PH is further reduced to a pressure PL lower than the pressure PH through a second regulator valve $22_2$. A ratio control valve 24 comprising a spool valve includes a spool 26 resiliently biased leftwardly by a valve spring 25. The pressure PH from the first regulator valve $22_1$ is transmitted to a port $P_1$ in the ratio control valve 24, and the pressure PL from the second regulator valve $22_2$ is transmitted to left and right ports $P_2$, $P_2$.

When the spool 26 of the ratio control valve 24 is positioned leftwardly, as shown in FIG. 6, the pressures PL and PH are transmitted to the oil chamber 9 for the drive pulley 6 and the oil chamber 14 for the driven pulley 11, respectively, thereby causing the gear ratio to be changed toward the LOW value. When the spool 26 of the ratio control valve 24 is moved rightwardly, as shown in FIG. 7B, the pressures PH and PL are transmitted to the oil chamber 9 for the drive pulley 6 and the oil chamber 14 for the driven pulley 11, respectively, thereby causing the gear ratio to be changed toward the OD value.

A solenoid pressure PS is transmitted as a pressure PA through the normally opened solenoid valve SOL-A to a port P3 which is opposed to a stepped portion formed in the vicinity of a left end of the spool 26, and a solenoid pressure PS is transmitted as a pressure PB through the normally closed solenoid valve SOL-B (when open) to a port P4 which is opposed to the left end of the spool 26.

Figure 5:
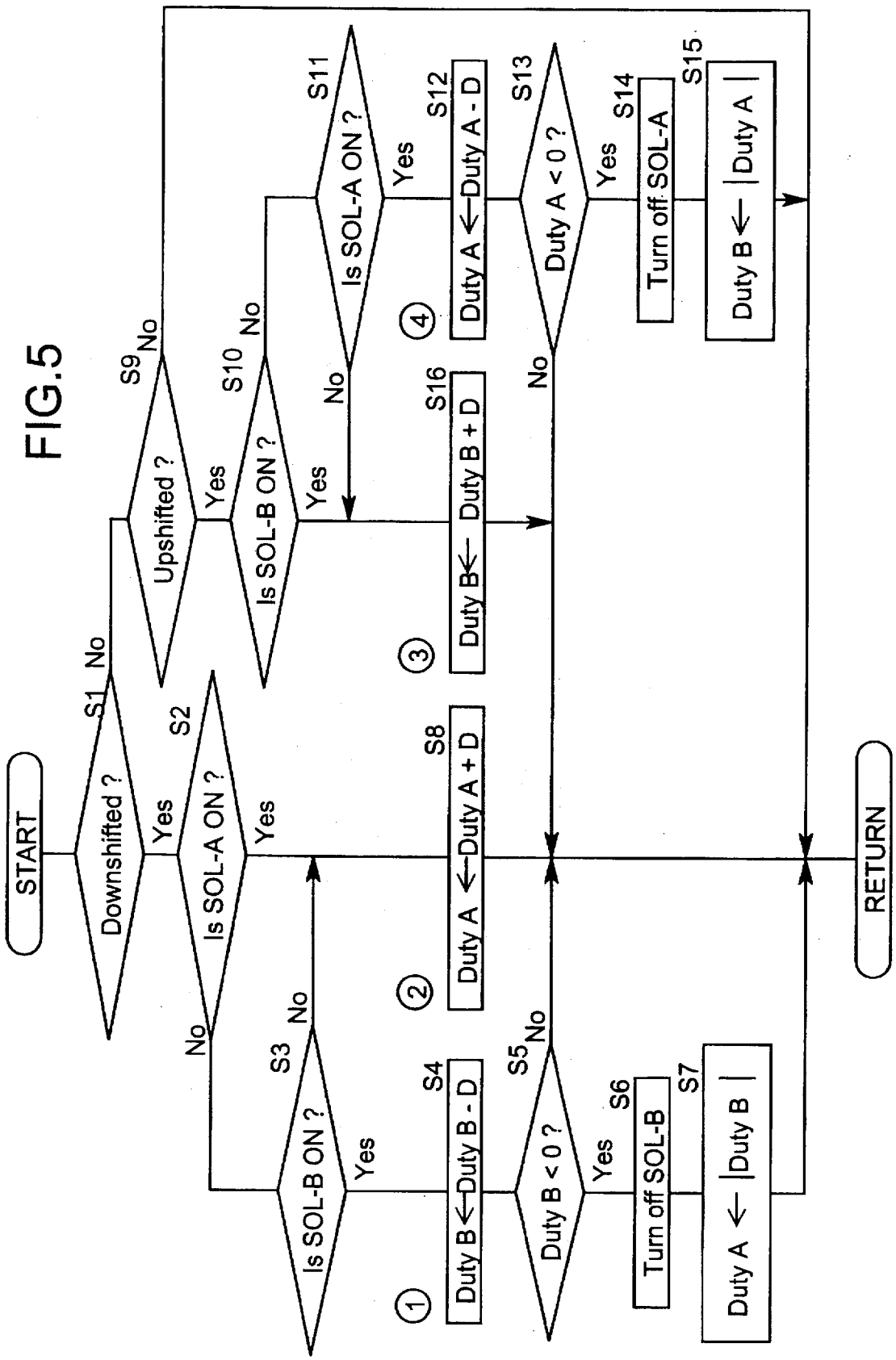
FIG. 5 is a flow chart for explaining the operation of the control system.

The normally opened solenoid Valve SOL-A and the normally closed solenoid valve SOL-B are duty-controlled according to FIGS. 3 and 5 and Table 1, as in the first embodiment. More specifically, when the gear ratio is equal to the LOW value, the normally opened solenoid valve SOL-A is in its fully closed state with its duty rate Duty A equal to 100%, and the normally closed solenoid valve SOL-B is in its fully closed state with its duty rate Duty A equal to 0%. Therefore, the pressures PA and PB are not applied (are zero) to the ports $P_3$ and $P_4$ in the ratio control valve 24, and the spool 26 is located at a left end position shown in FIG. 6 under the action of the resilient force of the valve spring 25. Thus, the pressure PL is applied to the oil chamber 9 for the drive pulley 6, and the pressure PH is applied to the oil chamber 14 for the driven pulley 11, thereby causing the gear ratio to be brought into the LOW value. When the duty rate Duty A of the solenoid valve SOL-A is decreased from 100% toward 0%, so that the opening degree of the solenoid valve SOL-A is gradually increased, the pressure PA applied to the port $P_3$ in the ratio control valve 24 is gradually increased, causing the spool 26 to be moved rightwardly, as shown in FIG. 7A. As a result, the intermediate values of the pressures PH and PL are applied to both the oil chamber 9 for the drive pulley 6 and the oil chamber 14 for the driven pulley 11, thereby causing the gear ratio to be changed from the LOW value to the intermediate value.

Figure 7B:
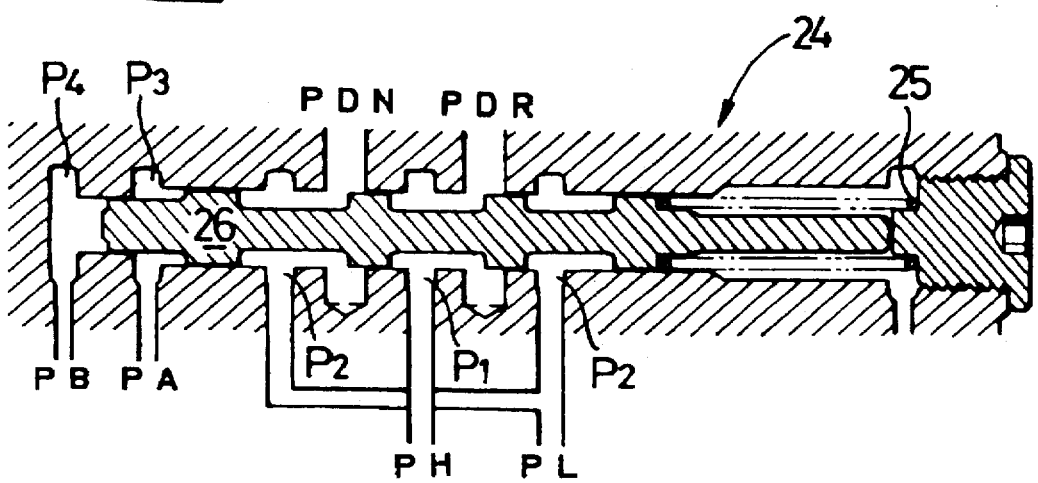
Figure 8:
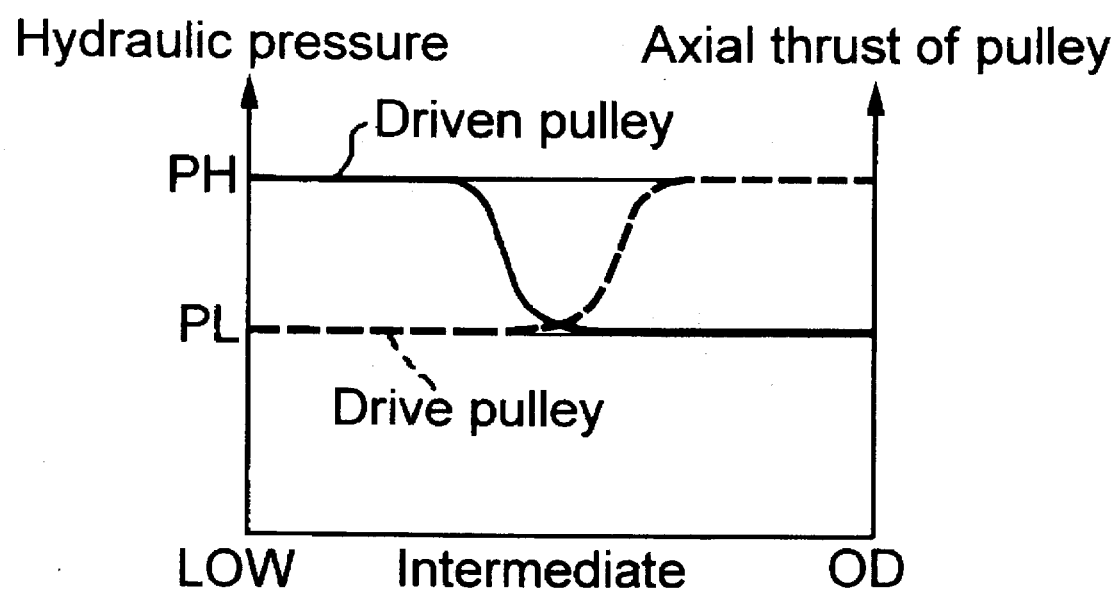
FIG. 8 is a graph illustrating the characteristics of the ratio control valve.

Further, when the duty rate Duty B of the solenoid valve SOL-B is increased from 0% toward 100%, so that the opening degree of the solenoid valve SOL-B is increased, the pressure PB applied to the port P4 in the ratio control valve 24 is gradually increased, causing the spool 26 to be moved to a right end position, as shown in FIG. 7B. As a result, the pressure PH is applied to the oil chamber 9 for the drive pulley 6, and the PL pressure is applied to the oil chamber 14 for the driven pulley 11, thereby causing the gear ratio to be brought into the OD value. FIG. 8 illustrates the relationships among the PH and PL pressures, the axial thrust on the pulley, and the gear ratios of the transmission.

Even in the second embodiment, when the gear ratio is between the LOW value and the intermediate value, the duty rate of the solenoid valve SOL-A is controlled, and when the gear ratio is between the OD value and the intermediate value, the duty rate of the solenoid valve SOL-B is controlled. Therefore, it is possible to effect a fine precise control, as compared with the case where a single solenoid valve is used.

If any trouble is produced, the gear ratio of the belt-type continuously variable transmission T can be held at the intermediate value by bringing both of the solenoid valves SOL-A and SOL-B into their OFF states, or bringing both of the solenoid valves SOL-A and SOL-B into their ON states.

Although the embodiments of the present invention have been described in detail, it will be understood that the present invention is not limited to the above-described embodiments, and various modifications in design may be made without departing from the spirit and scope of the invention defined in claims.

What is claimed is:

1. A control system for a belt-type continuously variable transmission, comprising:

a drive pulley which is variable in groove width;

a driven pulley which is variable in groove width;

an endless belt wound around both of said pulleys;

a ratio control valve for controlling a gear ratio by increasing or decreasing a hydraulic pressure supplied to at least one of oil chambers for said pulleys for varying the widths of said pulleys; and a solenoid valve means which is controlled to supply a control hydraulic pressure to said ratio control valve, wherein said solenoid valve means comprises a first solenoid valve and a second solenoid valve, and in a lower gear ratio range, one of said solenoid valves is controlled and the other solenoid valve is fixed at a predetermined control quantity, while in a higher gear ratio range, the other solenoid valve is controlled and the one solenoid valve is fixed at the predetermined control quantity.

2. A control system for a belt-type continuously variable transmission according to claim 1, wherein one of said first and second solenoid valves is of a normally opened type which is brought into an opened state with the control quantity of 0 (zero), and the other solenoid valve is of a normally closed type which is brought into a closed state with the control quantity of 0 (zero), and in an intermediate gear ratio range, the control quantity of each of the solenoid valves is equal to 0 (zero).

3. A control system for a belt-type continuously variable transmission according to claim 1, wherein one of said first and second solenoid valves is of a normally opened type which is brought into an opened state with the control quantity of 0 (zero), and the other solenoid valve is of a normally closed type which is brought into a closed state with the control quantity of 0 (zero), and in an intermediate gear ratio range, the control quantity of each of the solenoid valves is equal to the maximum value.

4. A control system for a belt-type continuously variable transmission according to claim 1, wherein said predetermined control quantity is equal to 0 (zero).

5. A control system for a belt-type continuously variable transmission having a belt wound around drive and driven pulleys that are variable in width by supplying increasing and decreasing hydraulic pressures to an oil chamber of at least one of the pulleys for varying the gear ratio; comprising:

a ratio control valve for controlling the increasing or decreasing hydraulic pressure supplied to the oil chamber of the at least one of the pulleys; and first and second solenoid valves for supplying a control hydraulic pressure to said ratio control valve, wherein only said first solenoid valve being controlled for degree of opening in a lower gear ratio range and only said second solenoid valve being controlled for degree of opening in a higher gear ratio range.

6. A control system for a belt-type continuously variable transmission according to claim 5, wherein said first solenoid valve is of a normally opened type which is brought into an opened state with a control quantity of 0 (zero), and second solenoid valve is of a normally closed type which is brought into a closed state with a control quantity of 0 (zero), and in an intermediate gear ratio range the control quantity of each of the solenoid valves is equal to 0 (zero).

* * * * *